United States Patent [19]

Plummer

[11] Patent Number: 4,723,603

[45] Date of Patent: Feb. 9, 1988

[54] PREVENTING PLUGGING BY INSOLUBLE SALTS IN A HYDROCARBON-BEARING FORMATION AND ASSOCIATED PRODUCTION WELLS

[75] Inventor: Mark A. Plummer, Littleton, Colo.

[73] Assignee: Marathon Oil Company, Findlay, Ohio

[21] Appl. No.: 10,518

[22] Filed: Feb. 3, 1987

[51] Int. Cl.$^4$ ............................................. E21B 43/22
[52] U.S. Cl. ....................................................... 166/275
[58] Field of Search ............... 166/268, 275, 274, 273, 166/305.1, 248, 270

[56] References Cited

U.S. PATENT DOCUMENTS 3,417,823 12/1968 Faris ...................................... 166/248
4,051,901 10/1977 Sarem et al. .......................... 166/270

OTHER PUBLICATIONS

Hudgins, Jr., et al., "How Conoco Floods with Seawater", *The Oil and Gas Journal*, Feb. 15, 1971, pp. 71–77.
Moore, "How to Combat Swelling Clays", *The Petroleum Engineer*, Mar., 1960, pp. B-78, B-90, B-94–96 & B-98-100.
Ostroff, "Compatibility of Waters for Secondary Recovery", *Producers Monthly*, Mar., 1963, pp. 2, 4–8.

R. E. Lacy, "Membrane Separation Process," Chemical Engineering, Sep. 4, 1972, pp. 56–73.
W. Dudley, "Low-Pressure Reverse Osmosis Pretreatment for Distiller Feedwater," Naval Ship Res. and Dev., Annapolis, MA, Nat. Tech. Information Serv., U.S. Dept. of Commerce, Sep. 1975, 5 pages, 7 figs.
G. G. Wensley et al, "Ion Selective Membranes a Presoftening Process for Seawater Distillation," Proc. of the 7th Intl. Symposium on Fresh Water from the Sea, vol. 1, pp. 427–426, 1980.
M. J. Sweeney, "Membrane-Based Liquid Separation Systems," Chem. Engineering Progress, Jan. 1985, pp. 32–35.

*Primary Examiner*—Stephen J. Novosad
*Attorney, Agent, or Firm*—Jack L. Hummel; Rodney F. Brown

[57] ABSTRACT

Plugging in fluid passageways of a subterranean hydrocarbon-bearing formation or associated production wells caused by the accumulation of insoluble salt precipitates therein which results from an in situ interaction between precipitate precursor ions in an injection water and resident ions already occurring in the formation is prevented by removing the precursor ions from the injection water by a reverse osmosis membrane before injecting the water into the formation.

21 Claims, No Drawings

PREVENTING PLUGGING BY INSOLUBLE SALTS IN A HYDROCARBON-BEARING FORMATION AND ASSOCIATED PRODUCTION WELLS

BACKGROUND OF THE INVENTION

1. Technical Field

The present invention relates to a process facilitating hydrocarbon recovery from a subterranean formation and more specifically to a process preventing plugging of the formation and associated production wells.

2. Description of Related Art

Water is commonly injected into subterranean hydrocarbon-bearing formations by itself or as a component of miscible or immiscible displacement fluids to recover hydrocarbons therefrom. Injection water can be obtained from a number of sources including brine produced from the same formation, brine produced from remote formations, or sea water. All of these waters typically have a high ionic content relative to fresh water.

Some ions present in an injection water can benefit hydrocarbon production. For example, certain combinations of cations and anions, including $K^+$, $Na^+$, $Cl^-$, $Br^-$, and $OH^-$, can stabilize clay to varying degrees in a formation susceptible to clay damage from swelling or particle migration.

However, other ions present in the injection water can produce harmful effects in situ. For example, divalent $SO_4^-$ anions in the injection water are particularly problematic because $SO_4^-$ forms salts with many naturally-occurring cations already present in the formation, such as $Ba^{++}$. The resulting salts can be relatively insoluble at the formation temperatures and pressures. Consequently they precipitate out of solution in situ. Solubility of the salts further decreases as the injection water is produced to the surface with the hydrocarbons because of pressure and temperature decreases in the production well.

The precipitates of the insoluble salts accumulate in subterranean fluid passageways as crystalline structures which ultimately plug the passageways and reduce hydrocarbon production. The effects of plugging are most severe in passageways located in the formation near wellbores and in production wells where it is more difficult for the produced fluids to circumvent blocked passageways.

Prior art solutions to the problem of formation and production well plugging focus on preventing or inhibiting crystal formation in situ by supplementing the injection water with additives or backflowing a well with produced formation water containing additives. For example, ethylenediaminetetraacetic acid (EDTA) is a crystal modifier which can inhibit the in situ growth of crystals from insoluble salt precipitates. However, prior art processes are not totally satisfactory because the cost of chemical additives is significant and the cost escalates over the production life of the formation. Furthermore, the processes are ineffective without painstaking process control to ensure proper stochiometric concentration and in situ mixing of the additives.

An effective process for preventing plugging in a hydrocarbon-bearing formation and associated production wells by insoluble salts is needed which overcomes the drawbacks of the prior art. A process is needed which is relatively low cost and is relatively easy to control at the surface.

SUMMARY OF THE INVENTION

The present invention is a process for reducing or preventing plugging in fluid passageways of hydrocarbon-bearing formations and in production wells which is caused by the accumulation of insoluble salt precipitates therein. This objective is achieved by removing most or all of the precursor ions of the insoluble salt precipitates from an injection water at the surface before the water is injected into the formation. Thus, insufficient precursor ions are available to react with ions already present in the formation to form significant amounts of the insoluble salt precipitates.

The precursor ions of the insoluble salt precipitates are removed by means of a reverse osmosis membrane. The present invention has several advantages because it reduces precipitate formation by removing the offending precursor ions, rather than inhibiting precipitate formation by adding chemical additives as in the prior art. Once the reverse osmosis unit of the present invention is in place, ongoing operating costs are considerably lower than injecting chemical additives. More importantly, process control in the present invention is much easier to perform and produces more effective results because all process steps are conducted at the surface rather than in situ.

DESCRIPTION OF PREFERRED EMBODIMENTS

The present invention is a process for removing precursor ions from an injection water which form insoluble salt precipitates in situ when they contact resident ions already present in a subterranean hydrocarbon-bearing formation. The process substantially reduces or prevents the formation of the precipitates which undesirably accumulate and plug subterranean fluid passageways. As defined herein, subterranean fluid passageways encompass pores in a formation matrix; formation anomalies such as fractures, voids, cavities, and vugs; and wells, including cased and uncased wellbores, tubing, and annuli between casing and tubing.

The precipitates are commonly termed insoluble salts, crystals, or scale and these terms may be used synonymously herein. Plugging is defined herein as a substantial reduction in permeability and/or porosity of a fluid passageway to injection fluids or hydrocarbons. The term injection water as used herein is any aqueous liquid which contains water and which is injected as a displacement fluid into a hydrocarbon-bearing formation via an injection well to facilitate the recovery of hydrocarbons from the formation via a production well. Thus, water by itself or an aqueous solution containing water as the solvent is within the definition of injection water. Common displacement fluids such as aqueous polymer solutions and aqueous surfactant solutions can be injection water as defined herein.

The present process is broadly applicable to an injection water containing precursor ions. Precursor ions are defined as ions which form insoluble salt precipitates at the conditions of the formation or associated production wells when they contact resident ions in situ. Resident ions are defined as naturally or artifically occurring ions already present in the formation upon injection of the injection water. An associated production well is a well in fluid communication with the formation and which produces hydrocarbons therefrom.

The precursor ion can be an anion or cation, but in all cases it must be a different ionic species and oppositely charged to the resident ionic species it contacts in the formation. Whether an ion in an injection water is actually a precursor ion in any given case depends to a great extent on the resident ionic species which it contacts in situ. A given ion can be a precursor ion when injected into one formation, but not in another. For example, if $Mg^{++}$ is injected into a formation and it contacts an $OH^-$ anion in situ, it will not form an insoluble precipitate. $Mg^{++}$ is not a precursor ion in this case. But, if $Mg^{++}$ contacts a $CO_3^-$ anion in situ when injected into another formation, it will form an insoluble precipitate. In this case, $Mg^{++}$ is a precursor ion.

Although many injection waters have a significant ion concentration, most ionic species contained in injection waters are not precursor ions in a given formation. However, the present invention focuses on the removal from the injection water of those cations or anions which are precursors of insoluble salts in a given formation. Specific ions which can be precursors of insoluble salt precipitates according to the definition herein and to which the present invention is applicable include $SO_4^-$, $CO_3^-$, $Fe^{++}$, $Fe^{+++}$, $Sr^{++}$, $Ba^{++}$ $Mg^{++}$, $Ca^{++}$, $Al^{+++}$, and mixtures thereof.

The actual precursor ion concentration at which precipitation occurs for a given case is a function of many variables including the concentration of other ions in solution and the in situ conditions of temperature, pressure and pH, to name a few. One of skill in the art can in many cases predict precipitation from data for the above-listed variables and apply the present process as a preventative before plugging actually occurs. One can also apply the present process as a remedial action after some in situ plugging is actually observed in order to prevent further plugging.

There is no fixed minimum threshold concentration of precursor ions in the injection water above which precipitation and plugging will occur in all cases. However, an injection water having a precursor ion concentration above about 100 ppm can often form a plugging precipitate when contacted with the appropriate resident ion in situ. Thus, the present process is generally applicable when the injection water has a precursor ion concentration above about 100 ppm and preferably above about 500 ppm.

Resident ions already present in the formation which have been observed to form insoluble salt precipitates upon contact with the precursor ions of the injection water include $Ba^{++}$, $Sr^{++}$, $Mg^{++}$, $Ca^{++}$, $Fe^{++}$, $Fe^{+++}$, $Al^{+++}$, $CO_3^-$, $SO_4^-$, and mixtures thereof. As noted whether an insoluble salt precipitate actually forms depends to a great extent on the given combination of precursor and resident ionic species which contact in situ. At a minimum, the two must be different species and oppositely charged.

The resident ions may be naturally occurring in the formation or may be artificially occurring in the formation as a result of some prior wellbore or formation treatment process. The resident ions need only be present in the formation at a sufficient concentration to form precipitates with the precursor ions at formation or production well conditions when they are injected into the formation.

The precipitate precursor ions are removed from the injection water by means of a reverse osmosis membrane. The membrane is housed in a conventional reverse osmosis unit. The feed to the unit is an untreated injection water containing a water solvent and precipitate precursor ions in sufficient concentration to form insoluble salt precipitates when injected into a formation of interest and contacted with resident ions already present therein. The water solvent is driven across the reverse osmosis membrane by a pumping pressure greater than the osmotic pressure of the untreated injection water and a treated injection water is recovered as product on the side of the membrane opposite the feed. The precursor ions remain on the same side of the membrane as the feed to form a brine having a higher concentration of precursor ions than the feed. The brine is discharged from the unit and disposed.

The treated injection water product has a substantially lower concentration of precursor ions than the feed. The concentration of precursor ions is sufficiently low such that the treated injection water product is substantially incapable of forming insoluble salt precipitates in sufficient quantities to plug fluid passageways in the formation or associated production wells when injected into the formation of interest. Although this value of concentration varies as a function of the formation condition, it is generally advantageous to reduce the precursor ion concentration in the treated injection water product below about 500 ppm and preferably below about 100 ppm.

As stated above, the feed is maintained in the unit at a pressure above the osmotic pressure for the feed conditions and membrane type. The osmotic pressure can be determined by one of skill in the art. Generally the present process is operated within a pressure range of about 690 to about 6900 kPa. The process is usually operated at the temperature of the feed, but is operable within a range of about 2 to about 200° C. The process is operable across a wide range of pH. If desired, the pH of the feed can be adjusted to enhance the operation of the unit within a range of about 1 to about 13.

Any number of reverse osmosis membranes known in the art may be employed in the present invention. Materials comprising reverse osmosis membranes include cellulose acetate, polyamide, and sulfated polysulfone, to name a few. The reverse osmosis membrane should at least be capable of preventing significant amounts of precipitate precursor ions from entering the injection water product. The membrane may also eliminate other ions from the injection water product.

However, the membrane is preferably one which selectively prevents the precipitate precursor ions from passing across it from the feed into the injection water product while at the same time allowing the water solvent and harmless ions to pass across it. The selectivity of a membrane is a function of the particular properties of the membrane, including the pore size of the membrane or the electrical change of the membrane. One selects a membrane for use in the present invention based on these criteria and its experimental performance. For example, a polyamide membrane is particularly effective for selectively preventing the precursor ion $SO_4^-$ from passing across it. A polyamide membrane manufactured by FilmTec Corporation, Minnepolis, Minn., U.S.A., having the trade name NF-40 is especially preferred for removing $SO_4^-$ from an injection water.

A selective membrane allows harmless ions to pass across it into the treated injection water product. These ions may even have a beneficial effect in the formation. For example, potential clay stabilizing ions, such as $K^+$, $Na^+$, $Cl^-$, $Br^-$ and $OH^-$, may be passed into the treated injection water product and subsequently injected into the formation to beneficially prevent clay swelling or particle migration if resident ions are not present in the formation which could from insoluble precipitates with these injected ions.

The reverse osmosis unit is preferably operated in a continuous manner, i.e., continuously feeding untreated injection water into the unit and continuously discharging a waste brine and a treated injection water product. The product output rate of the unit is, to a large part, a function of the type and surface area of the membrane, the temperature and pressure of the unit, and the desired degree of precursor ion exclusion from the injection water product. The optimum unit output is experimentally determined for a given set of conditions.

The product output should satisfy the injection water requirement for a given hydrocarbon recovery application and is generally within a range of about 8.49 to about 84.9 $l/m^2$-hr. The ratio of injection water product to waste brine discharged from the unit ranges from about 0.2:1 to about 4:1 and preferably is about 3:1. The unit is advantageously operated such that the percentage ion selectivity to the injection water product for precursor ions is less than about 10% and preferably less than about 3%. Percentage ion selectivity to the product is defined as the ion concentration in the product divided by the ion concentration in the feed expressed as a percentage.

The present process is particularly advantageous as an adjunct to a hydrocarbon displacement process where the injection water has a different ionic makeup than the formation water and where plugging occurs in fluid passageways of a production well or a near wellbore environment of an injection or production well. The near wellbore environment is defined herein as a volume of the formation within a radius up to about 5 meters from the wellbore axis. Plugging in or near wellbores is most harmful to hydrocarbon production because fluids are less able to flow around plugged fluid passageways in these locations. Fluids can flow around plugged passageways in the formation away from the wellbore because more alternative unplugged fluid passageways exist as alternatives to flow.

The following examples illustrate embodiments of the present invention but are not to be construed as limiting the scope thereof.

EXAMPLE 1

A synthetic injection water is treated in a reverse osmosis unit according to the present invention. The reverse osmosis membrane is a polyamide membrane having the trade name FilmTec NF-40. The membrane is a spiral tube having an outside diameter of about 6.4 cm and a length of about 6.1 meters. The untreated injection water feed contacts the outside surface of the membrane and the injection water product is recovered from the inside surface of the membrane. The unit produces about 25 liters of injection water product per square meter of membrane per hour. The product is about 75% by volume of the feed while the remaining 25% by volume of the feed is discharged as brine. The unit is operated at a temperature of about 22° C. and a pressure of about 1590 kPa, which is above the osmotic pressure of the feed.

The ion concentrations of the feed, product, and brine and the percentage ion selectivity to the product are shown in Table 1 below.

TABLE 1

| Ion Type | Ion Concentration mg/l | | | % Ion Selectivity To Product Water |
|---|---|---|---|---|
| | Feed | Product | Brine | |
| $Li^+$ | 1.9 | 1.8 | 2.2 | 94.7 |
| $Na^+$ | 8,970 | 8,175 | 11,180 | 91.1 |
| $K^+$ | 334 | 317 | 426 | 94.9 |
| $Mg^{++}$ | 1,026 | 502 | 2,630 | 48.9 |
| $Ca^{++}$ | 353 | 225 | 738 | 63.7 |
| $Sr^{++}$ | 17 | 8 | 32 | 47.1 |
| $Cl^-$ | 15,200 | 13,990 | 19,200 | 92.0 |
| $Br^-$ | 78.3 | 72.3 | 100 | 92.3 |
| $SO_4^=$ | 2,575 | 80 | 10,400 | 3.1 |
| TDS | 29,380 | 23,615 | 47,660 | 80.4 |
| pH | 8.26 | 8.04 | 8.20 | |

The results of Table 1 indicate that the membrane effectively excludes from the injection water product undesirable $SO_4^-$ ions which are precipitate precursors when contacted in situ with $Ba^{++}$ resident ions. The $SO_4^-$ concentration in the injection water product is sufficiently low to prevent substantial plugging in most cases when injected into a subterranean hydrocarbon-bearing formation containing $Ba^{++}$ resident ions. At the same time, the membrane allows a significant portion of the non-precursor ions to pass through the membrane into the injection water product, which can beneficially stabilize clay in situ.

EXAMPLE 2

Water flooding of a subterranean hydrocarbon-bearing formation, which contains naturally occurring $Ba^{++}$ ions, with an untreated injection sea water, which has an $SO_4^-$ ion concentration of about 2800 ppm, results in $BaSO_4$ scale formation in situ. The scale plugs fluid passageways in the formation and the production tubing of associated hydrocarbon production wells. Production in one of the wells is observed to decrease from 132,000 liters of oil per hour to 33,000 liters of oil per hour due to the plugged tubing. Water produced via the well contains 2000 ppm $BaSO_4$ precipitate. To prevent further plugging, the injection water is treated in a reverse osmosis unit prior to injection according to the present invention.

The injection water is fed to the reverse osmosis unit at a temperature of about 25° C. and a pressure of about 2000 kPa. Seventy-five percent by volume of the untreated feed is recovered as treated injection water product. The unit operates at a rate of 33 liters of injection water product per square meter of membrane per hour. The unit is sized such that the total output of treated injection water product is 660,000 liters per hour. The $SO_4^-$ concentration in the treated injection water product is reduced to 60 ppm. The entire treated injection water output of the unit is injected into the formation via injection wells in a water flooding process.

Oil and the injected water are produced from associated production wells in the formation. The produced water contains 114 ppm $BaSO_4$ precipitate, a significant reduction from the concentration of $BaSO_4$ in the produced water prior to treatment of the injection water. Furthermore, no significant decrease in oil production due to plugging is observed after treatment of the injection water.

While the foregoing embodiments of the invention have been described and shown, it is understood that all alternatives and modifications, such as those suggested and others, may be made thereto and follow in the scope of the invention.

I claim:

1. A process for recovering hydrocarbons from a subterranean hydrocarbon-bearing formation having fluid passageways therein comprising the steps of:
   (a) feeding to a reverse osmosis means an untreated injection water containing precipitate precursor ions in a concentration which would be sufficient to form insoluble salt precipitates in an amount to substantially plug fluid passageways if said untreated injection water contacted resident ions in the formation;
   (b) driving a portion of said untreated injection water feed across a membrane in said reverse osmosis means at a pressure above the osmotic pressure of said feed while excluding at least a portion of said precursor ions from crossing said membrane to produce a treated injection water product having a precursor ion concentration less than said concentration of precursor ions in said untreated injection water feed such that said precursor ion concentration in said product is insufficient to form said precipitates in an amount to substantially plug the fluid passageways when said treated injection water product contacts said resident ions in the formation;
   (c) injecting said treated injection water product into the hydrocarbon-bearing formation via an injection well;
   (d) displacing the hydrocarbons with said treated injection water product toward an associated production well; and
   (e) recovering the hydrocarbons from the formation via said production well.

2. The process of claim 1 wherein said precipitate precursor ions are anions and said resident ions are cations.

3. The process of claim 2 wherein said anions are divalent $SO_4^-$ ions.

4. The process of claim 2 wherein said cations are selected from the group consisting of $Ba^{++}$, $Sr^{++}$, and mixtures thereof.

5. The process of claim 1 wherein said concentration of precursor ions in said untreated injection water feed is greater than about 500 ppm.

6. The process of claim 1 wherein said concentration of precursor ions in said treated injection water product is less than about 100 ppm.

7. The process of claim 1 further comprising driving ions in said untreated injection water feed which remain substantially soluble when contacted by said resident ions in the formation across said membrane into said treated injection water product.

8. The process of claim 7 wherein said ions which remain substantially soluble in the formation stabilize clay in situ when injected with said treated injection water product into the formation.

9. The process of claim 8 wherein said clay stabilizing ions are selected from the group consisting of $K^+$, $Na^+$, $Cl^-$, $Br^-$, $OH^-$ and mixtures thereof.

10. The process of claim 1 wherein the fluid passageways are in a near wellbore environment of said injection well.

11. The process of claim 1 wherein the fluid passageways are in a near wellbore environment of said production well.

12. A process for recovering hydrocarbons from a subterranean hydrocarbon-bearing formation via an associated production well having a fluid passageway therein comprising the steps of:
    (a) feeding to a reverse osmosis means an untreated injection water containing precipitate precursor ions in a concentration which would be sufficient to form insoluble salt precipitates in an amount to substantially plug the fluid passageways in said production well if said untreated injection water contacted resident ions in the formation;
    (b) driving a portion of said untreated injection water feed across a membrane in said reverse osmosis means at a pressure above the osmotic pressure of said feed while excluding at least a portion of said precursor ions from crossing said membrane to produce a treated injection water product having a precursor ion concentration less than said concentration of precursor ions in said untreated injection water feed such that said precursor ion concentration in said product is insufficient to form said precipitates in an amount to substantially plug the fluid passageways in said production well when said treated injection water product contacts said resident ions in the formation;
    (c) injecting said treated injection water product into the hydrocarbon-bearing formation via an injection well;
    (d) displacing the hydrocarbons with said treated injection water product toward said associated production well; and
    (e) recovering the hydrocarbons from the formation via said production well.

13. The process of claim 12 wherein said precipitate precursor ions are anions and said resident ions are cations.

14. The process of claim 13 wherein said anions are divalent $SO_4^-$ ions.

15. The process of claim 13 wherein said cations are selected from the group consisting of $Ba^{++}$, $Sr^{++}$, and mixtures thereof.

16. The process of claim 12 wherein said concentration of precursor ions in said untreated injection water feed is greater than about 500 ppm.

17. The process of claim 12 wherein said concentration of precursor ions in said treated injection water product is less than about 100 ppm.

18. The process of claim 12 further comprising driving ions in said untreated injection water feed which remain substantially soluble when contacted by said resident ions in the formation across said membrane into said treated injection water product.

19. The process of claim 18 wherein said ions which remain substantially soluble in the formation stabilize clay in situ when injected with said treated injection water product into the formation.

20. The process of claim 19 wherein said clay stabilizing ions are selected from the group consisting of $K^+$, $Na^+$, $Br^-$, $OH^-$ and mixtures thereof.

21. The process of claim 12 wherein the fluid passageway in said production well is production tubing.

* * * * *

UNITED STATES PATENT AND TRADEMARK OFFICE
CERTIFICATE OF CORRECTION

PATENT NO. : 4,723,603　　　　　　　　　　　Page 1 of 2

DATED : February 9, 1988

INVENTOR(S) : Mark A. Plummer

It is certified that error appears in the above-identified patent and that said Letters Patent is hereby corrected as shown below:

Col. 1, line 30:　　Delete "$SO_4^-$" and insert --$SO_4^{--}$--.
Col. 1, line 31:　　Delete "$SO_4^-$" and insert --$SO_4^{--}$--.
Col. 2, line 62:　　Delete "artifically" and insert --artificially--.
Col. 3, line 10:　　Delete "$CO_3^-$" and insert --$CO_3^{--}$--.
Col. 3, line 22:　　Delete "$SO_4^-$, $CO_3^-$" and insert --$SO_4^{--}$, $CO_3^{--}$--.
Col. 3, line 49:　　Delete "$CO_3^-$, $SO_4^-$" and insert --$CO_3^{--}$, $SO_4^{--}$--.
Col. 3, line 50:　　After "noted", insert --above,--.
Col. 4, line 21:　　Delete "condition," and insert --conditions,--.
Col. 4, line 52:　　Delete "change" and insert --charge--.
Col. 4, line 57:　　Delete "$SO_4^-$" and insert --$SO_4^{--}$--.
Col. 4, line 59:　　After "NF-40" insert --,--.
Col. 4, line 60:　　Delete "$SO_4^-$" and insert --$SO_4^{--}$--.
Col. 5, line 2:　　 Delete "from" and insert --form--.
Col. 6, line 18:　　Delete "$SO_4^-$" and insert --$SO_4^{--}$--.
Col. 6, line 20:　　Delete "$SO_4^-$" and insert --$SO_4^{--}$--.
Col. 6, line 33:　　Delete "$SO_4^-$" and insert --$SO_4^{--}$--.
Col. 6, line 53:　　Delete "$SO_4^-$" and insert --$SO_4^{--}$--.
Col. 7, line 41:　　Delete "$SO_4^-$" and insert --$SO_4^{--}$--.
Col. 8, line 12:　　Delete "passageways" and insert --passageway--.
Col. 8, line 26:　　Delete "passageways" and insert --passageway--.
Col. 8, line 41:　　Delete "$SO_4^-$" and insert --$SO_4^{--}$--.

UNITED STATES PATENT AND TRADEMARK OFFICE
CERTIFICATE OF CORRECTION

PATENT NO. : 4,723,603

DATED : February 9, 1988

INVENTOR(S) : Mark A. Plummer

It is certified that error appears in the above-identified patent and that said Letters Patent is hereby corrected as shown below:

Col. 8, line 62: After "$Na^+$," insert --$Cl^-$

Signed and Sealed this

Fourth Day of October, 1988

*Attest:*

DONALD J. QUIGG

*Attesting Officer*     *Commissioner of Patents and Trademarks*